US012143474B2

(12) United States Patent
D'Netto

(10) Patent No.: US 12,143,474 B2
(45) Date of Patent: Nov. 12, 2024

(54) AUTHENTICATION OF PUBLIC ENCRYPTION KEYS USING AN ADMINISTRATIVE SIGNATURE

(71) Applicant: Tailscale Inc., Toronto (CA)

(72) Inventor: Thomas Michael Trevor D'Netto, San Francisco, CA (US)

(73) Assignee: Tailscale Inc., Toronto (CA)

( * ) Notice: Subject to any disclaimer, the term of this patent is extended or adjusted under 35 U.S.C. 154(b) by 155 days.

(21) Appl. No.: 17/931,413

(22) Filed: Sep. 12, 2022

(65) Prior Publication Data

US 2024/0089088 A1    Mar. 14, 2024

(51) Int. Cl.
*H04L 9/08* (2006.01)
*H04L 9/30* (2006.01)
*H04L 9/32* (2006.01)

(52) U.S. Cl.
CPC .............. *H04L 9/0825* (2013.01); *H04L 9/30* (2013.01); *H04L 9/3247* (2013.01)

(58) Field of Classification Search
CPC ......... H04L 9/006; H04L 9/08; H04L 9/0816; H04L 9/0838; H04L 9/0825
See application file for complete search history.

(56) References Cited

U.S. PATENT DOCUMENTS

| 9,660,970 | B1 * | 5/2017 | Rubin | H04L 9/0891 |
| 2015/0188887 | A1 * | 7/2015 | Thomas | H04L 63/0272 |
| | | | | 713/153 |
| 2015/0381372 | A1 * | 12/2015 | Foerster | H04L 63/0823 |
| | | | | 713/168 |
| 2022/0029973 | A1 * | 1/2022 | Carney | H04L 61/5007 |
| 2022/0255905 | A1 * | 8/2022 | Carney | H04L 63/0263 |
| 2023/0022797 | A1 * | 1/2023 | Chitalia | G06Q 20/40145 |
| 2023/0316263 | A1 * | 10/2023 | Eby | G06Q 20/065 |
| 2024/0193250 | A1 * | 6/2024 | Chen | G06F 21/33 |

* cited by examiner

*Primary Examiner* — Boris D Grijalva Lobos

(57) ABSTRACT

Described herein are systems, methods, and software to manage the approval of new computing elements for a private network. In one implementation, an administrator computing device in a private network is configured to receive a notification for a computing element to join the private network, wherein the notification includes a public key for the computing element and supplemental information for the computing element. The administrator computing device further identifies input indicating that the computing element is approved for the private network and, in response to the input, signs at least the public key. Once signed, the administrator computing device distributes the signed public key to one or more other computing elements in the private network.

20 Claims, 6 Drawing Sheets

AUTHENTICATION OF PUBLIC ENCRYPTION KEYS USING AN ADMINISTRATIVE SIGNATURE

TECHNICAL BACKGROUND

In computing networks, physical and virtual computing systems can include applications and services that require communications with other computing systems to provide desired operations. For example, an application on a first computing system may require data from a storage server located on a second computing system. To provide the communication, the data payload may be placed in a network packet and transferred to the required computing system. However, although network packets provide a method of communication between computing systems, difficulties often arise in maintaining security and configuration information to support the communications.

To overcome some of the deficiencies presented in securing network communications, various technologies have been developed. These technologies include virtual local area networks (VLANs), encryption for the data payload within the data packets, amongst other similar security procedures. Yet, while these security technologies may provide additional security over unprotected network packets, configuring individual networks can be difficult and cumbersome. Further, when an organization uses a third-party product to help manage or secure the networks, additional security vulnerabilities can be created by providing security information (encryption keys, addressing, and the like) to the third-party. This can permit the third party to make changes to the network or the available devices without the knowledge of the organization.

SUMMARY

The technology described herein manages security and permissions for a device joining a private network. In one implementation, an administrator computing element receives a notification from a coordination service indicating a request for a computing element to join a private network, wherein the notification includes at least a public key for the computing element and supplemental information for the computing element. After receiving the notification, the administrator computing element identifies an indication that the computing element is approved. In response to the approval, the administrator computing element signs at least the public key associated with the computing element using an administrative key for the administrator computing element and distributes the signed public key to other computing elements in the private network. In at least one example, the indication that the computing element is approved can comprise a user selection via a user interface of the administrator computing element.

In one implementation, a second computing element in the private network receives the distributed signed public key and, in response to receiving the distributed signed public key, adds communication information associated with the computing element to one or more data structures permitting communication with the computing element. Prior to receiving and verifying a signed key, the second computing element will be prevented from communicating with the computing element.

DETAILED DESCRIPTION

Figure 1:
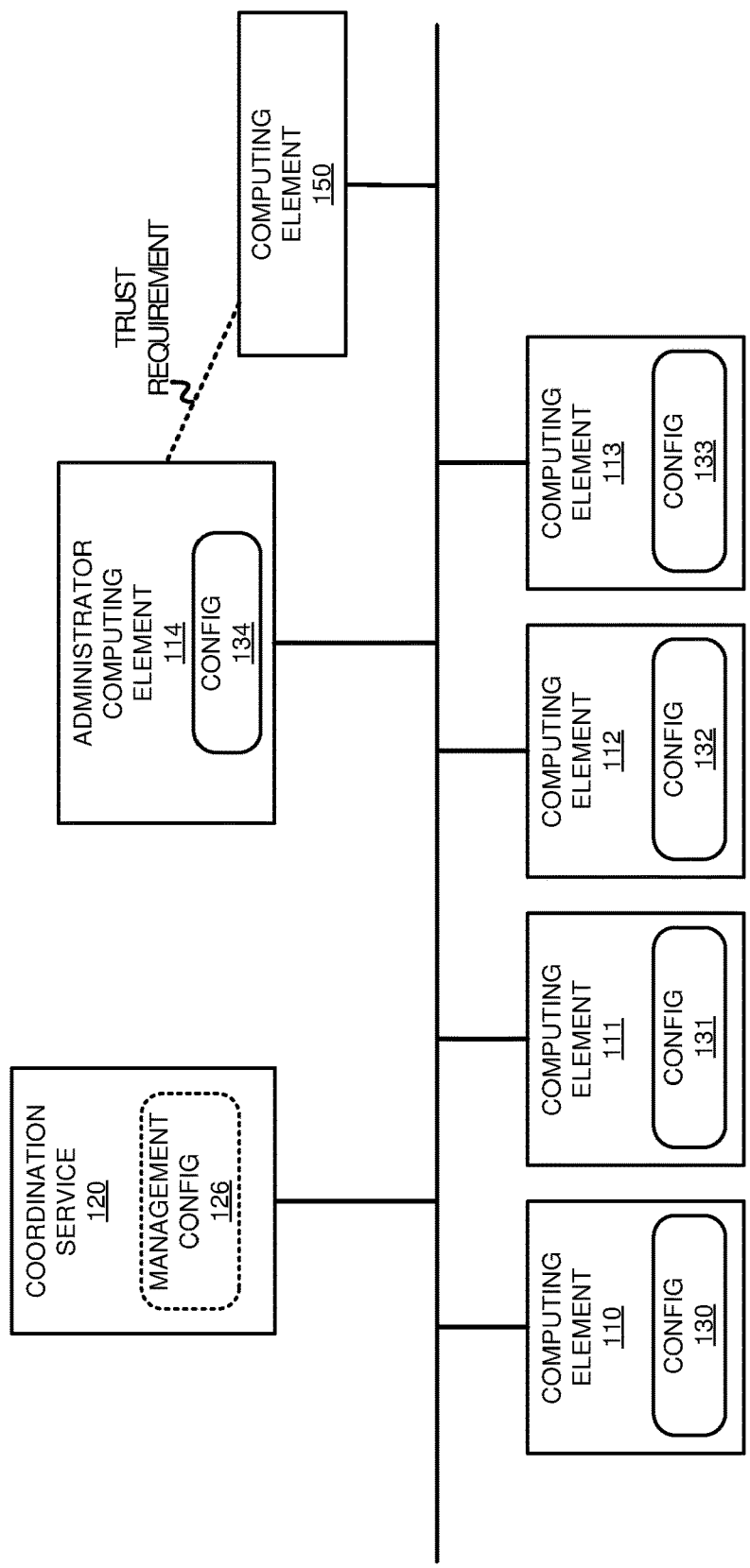
FIG. 1 illustrates a computing environment to manage a join event for a computing element to a private network according to an implementation.

FIG. 1 illustrates a computing environment 100 to manage a join event for a computing element to a private network according to an implementation. Computing environment 100 includes computing elements 110-113, administrator computing element 114, computing element 150, and coordination service 120. Computing elements 110-113 and administrator computing element 114 include configurations 130-134 that represent one or more data structures, permitting the computing elements to provide secure communications in a private network. Computing elements 110-113, administrator computing element 114, and computing element 150 can comprise physical computers or can comprise virtual computing elements, such as virtual machines in some examples. Coordination service 120 can execute on one or more computers, wherein the computers can comprise a processing system, storage, and one or more network interfaces.

In computing environment 100, coordination service 120 acts as a management service that distributes communication information to the computing elements in a private network based on management configuration 126. The communication information can include encryption keys for the computing elements, public addressing information (IP addresses, ports, or other similar information), private addressing information (private IP addresses associated with the overlay private network), domain name system (DNS) lookup information for the computing elements in the private network, or some other information. When a computing element joins the network, such as computing element 110, the computing element can generate a public and a private key and distribute the public key along with public addressing information to one or more other computing elements in the private network via coordination service 120. Additionally, coordination service 120 can allocate private addressing information to the joining computing element that permits the joining computing element to be uniquely addressed in the overlay private network.

For example, after computing element 110 joins a private network with computing element 111, an application on computing element 111 can generate a packet that addresses computing element 110 using a private IP address associated with computing element 110 and provided by coordination service 120. Coordination service 120 can allocate a unique private IP address for each computing element in the private network. Once the packet is generated by the application at computing element 110, computing element 110 encapsulates the packet using a public encryption key associated with computing element 111 and forwards the packet to computing element 111 using the public addressing associated with computing element 110-111. Once received, computing element 111 can decapsulate the packet using the private key and forward the packet to the corresponding application.

Here, in registering a computing element to the private network, administrator computing element 114 is provided, wherein administrator computing element can approve a new computing element prior to permitting the computing element to communicate on the network. For example, when computing element 150 joins the network, computing element 150 may communicate a public key and supplemental information to coordination service 120. The supplemental information can include device identifier information, user identifier information, public IP address information, or some other information associated with computing element 150. In response to receiving the registration information coordination service 120 can provide the public key and the supplemental information to administrator computing element 114. Administrator computing element 114 can provide a user interface to a user that indicates the supplemental information for computing element 150, permitting the user to approve or block computing element 150 from joining the private network. If blocked from joining the network, no further information will be communicated to other computing elements in the private network, preventing communications with computing element 150. If permitted to join the network, administrator computing element 114 can sign at least the public key for computing element 150 and communicate the signed public key to other computing elements in the private network. Administrator computing element 114 can further sign at least a portion of the supplemental information, such as the public IP address associated with computing element 150, port information, or some other information associated with computing element 150. In some examples, the signed key is distributed using coordination service 120, however, administrator computing element 114 can directly communicate with the other computing elements in some examples with the signed key.

Figure 2:
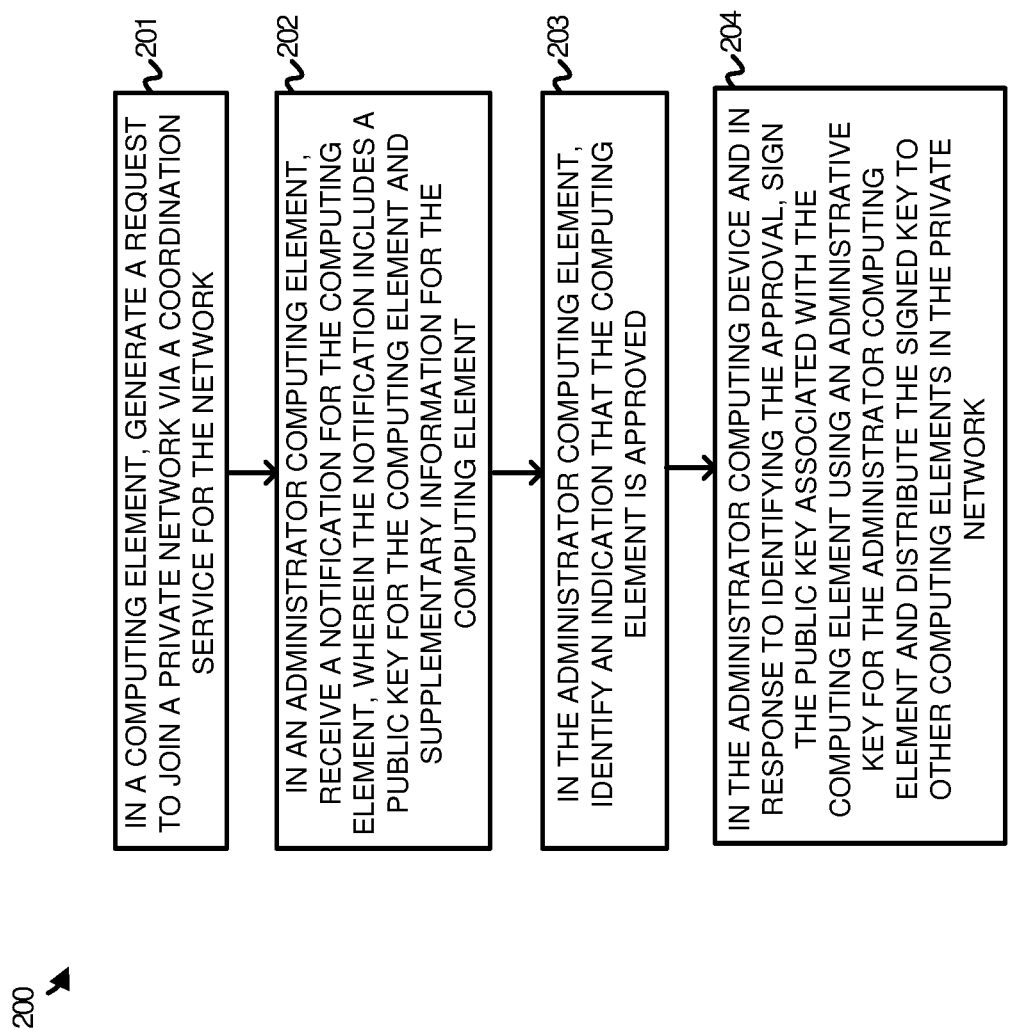
FIG. 2 illustrates a method of operating a computing environment to manage a join event for a computing element to a private network according to an implementation.

FIG. 2 illustrates a method 200 of operating a computing environment to manage a join event for a computing element to a private network according to an implementation. The steps of method 200 are referenced parenthetically in the paragraphs that follow with reference to systems and elements of computing environment 100. Although demonstrated with computing element 150 joining the private network, similar operations can be performed with other computing elements joining the private network.

Method 200 includes, in a computing element 150, generating (201) a request to join a private network via a coordination service for the network. The request can include a public key for encrypted communications to computing element 150, can include public IP addressing associated with computing element 150, can include device or user identifier information, or can include some other supplemental information for computing element 150. After the request is provided to the coordination service, the coordination service then communicates a notification to administrator computing element 114. Method 200 further includes, in administrator computing element 114, receiving (202) the notification for computing element 150 to join the private network, wherein the notification includes the public key for computing element 150 and supplemental information for computing element 150. The supplemental information can include a device name, a username for computing element 150, the public IP address associated with computing element 150, or some other information for computing element 150.

After receiving the notification, at least a portion of the supplemental information can be displayed as part of a user interface at administrator computing element 114. Method 200 further includes, in administrator computing element 114, identifying (203) an indication that computing element 150 is approved to join the private network. The indication may comprise a selection of a button indicating approval, a dropdown menu or slider, or some other user feedback to indicate the approval of computing element 150. After approving computing element 150, method 200 further includes, in administrator computing element 150, signing (204) at least the public key associated with computing element 150 using an administrative key for administrator computing element 150 and distributing the signed public key to one or more other computing elements in the private network, wherein the signed public key permits communications with computing element 150. In some examples, administrator computing element 114 may sign additional information associated with computing element 150, however, signing the key may also verify the other information associated with computing element 150. The administrative key is a special key used by administrator computing element 114 to generate a hash that indicates that no portions of the key (or other data associated with computing element 150) have been modified. The public side of the In some implementations, when computing element 150 joins coordination service 120, the computing system can provide, as part of the join request, communication information to the coordination service. The communication information can include public addressing information, a public encryption key to communicate with computing element 150, or some other communication information. The communication information can then be distributed, along with private addressing information (private IP address allocated by coordination service 120, port information, or some other private addressing information assigned to the element by coordination service 120) for computing element 150, to other computing elements such as computing elements 110-111. However, without a signature of at least the public key associated with computing element 150 by administrator computing element 114, computing elements 110-111 will be incapable of communicating with computing element 150. In some examples, computing elements 110-111 can cache the information provided by coordination service 120. Once cached, each computing element 110-111 can wait for the signed data from administrator computing element 114 to add the communication information including the key into a data structure that permits communications between the computing elements. The data structure can associate the public key with public addressing information, private addressing information, or other information to permit communications with computing element 150.

In other implementations, administrator computing element 114 can communicate a notification to coordination service 120 that permits coordination service 120 to distribute the communication information with the signed key to the other computing element 110-111. Thus, the communication information for computing element 150 is only communicated to computing elements 110-111 when a signed key is available for computing element 150.

In some examples, when computing element 150 requests to join the private network via coordination service 120, coordination service 120 can provide communication information from management configuration 126 to computing element 150. The communication information can include public addressing associated with other computing elements in the private network, private addressing information allocated from coordination service 120 to other computing elements in the private network, or some other communication information. However, until the signed public key is distributed by administrator computing element 114, no communications will be sent or received by computing element 150, as the other computing elements will not have approved the communication information associated with computing element 150.

Although demonstrated as receiving user feedback to approve computing element 150, an administrator can provide rules as part of configuration 134 that indicate the types of devices that are permitted to join the private network. The rules can include usernames, device types, public IP subnets, or some other information associated with a joining computing element. For example, when computing element 150 joins the network, a user identifier and device identifier can be communicated to administrator computing element 114. The user identifier and device identifier can be compared to rules at administrator computing element 114 to determine whether computing element 150 is permitted to join the private network. If it is not permitted to join the private network, the administrator computing element 114 will not sign the public key associated with computing element 150. Administrator computing element 114 may wait for a user to determine whether computing element 150 can join the network (i.e., provide a manual approval) or may reject the computing element completely from joining the private network. If the automatic rules in configuration 134 indicate that computing element 150 is permitted to join the network, administrator computing element 114 can sign the public key for computing element 150 using the administrative key for administrator computing element 114 and distribute keys to one or more elements in the private network, including computing elements 110-111. When signing the public key, administrator computing element 114 can apply a hash to the public key and encrypt the hash result using the administrative key. The administrative key can comprise a private key used for approving devices for the private network, wherein the other computing elements can use a public key associated with the administrative key to check the signature from administrator computing element 114.

Figure 3:
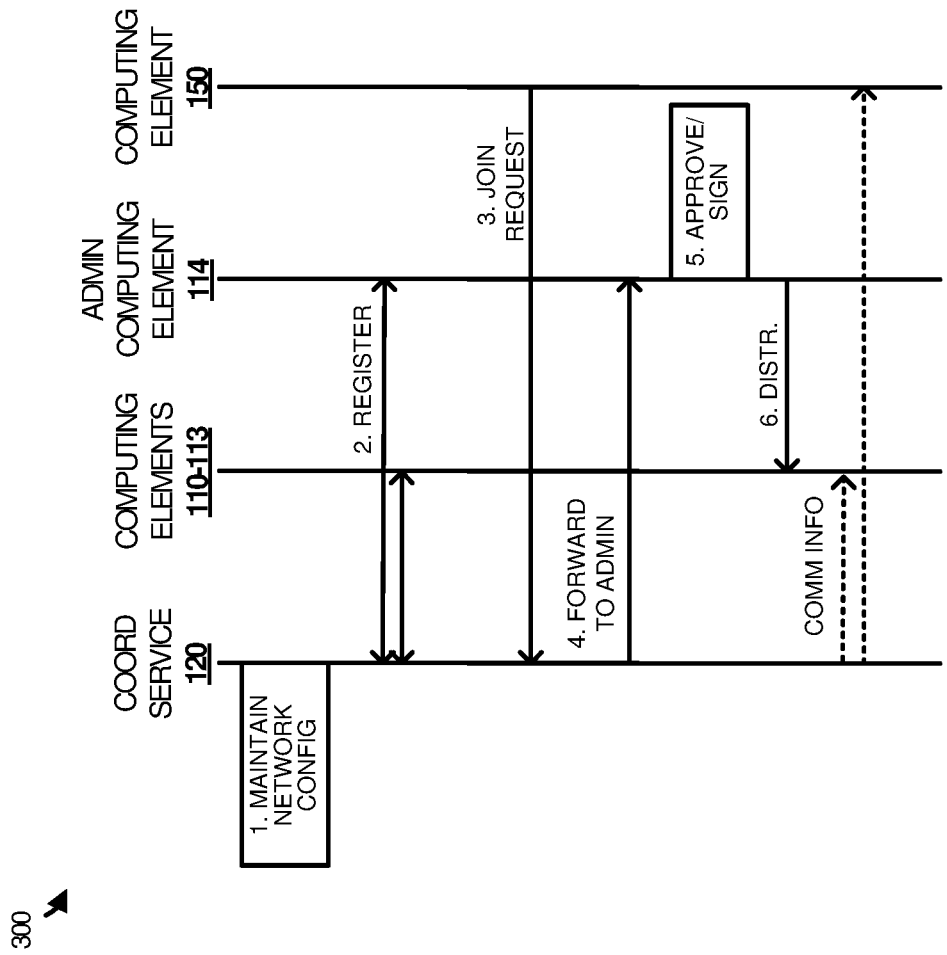
FIG. 3 illustrates a timing diagram of a computing element joining a private network according to an implementation.

FIG. 3 illustrates a timing diagram 300 of a computing element joining a private network according to an implementation. Timing diagram 300 includes computing elements 110-113, coordination service 120, administrator computing element 114, and computing element 150 from computing environment 100 of FIG. 1.

In timing diagram 300, coordination service 120 maintains a network configuration for computing elements in a private network at step 1. The network configuration may comprise communication information (e.g., public, and private addressing) associated with computing elements in the network, communication rules for different devices in the private network (e.g., what devices are permitted to communicate), or some other information associated with the private network. While maintaining the network configuration, computing elements 110-113 can register with the private network using coordination service 120 at step 2. The registration may include providing encryption key information to coordination service 120, providing public addressing information for the computing element to coordination service 120, providing device or user information to coordination service 120, or providing some other information to coordination service 120. Additionally, coordination service 120 can distribute the information about the computing elements to other computing elements in the private network. The communication information can include public addressing information for each of the computing elements, private addressing information (e.g., private IP addressing assigned by coordination service 120), encryption information, and the like. For example, when computing element 110 registers with coordination service 120, coordination service 120 can distribute communication information associated with computing element 110 to the other computing elements in the network. Additionally, coordination service 120 can distribute communication information about the other computing elements to computing element 110 to permit computing element 110 to communicate in the private network.

Here, after computing elements 110-113 register with the coordination service 120 and are approved by administrator computing element 114, computing element 150 generates a request to join the private network at step 3, wherein the request is received by coordination service 120. The request can include a public IP address associated with computing element 150, public encryption information for computing element 150, device or user identifier information, or some other information for joining computing element 150 to the private network. After receiving the request, coordination service 120 forwards, at step 4, a notification to administrator computing element 114. The notification may include device identifier information associated with computing element 150, user identifier information for a user of computing element 150, public IP addressing information, and the public encryption key associated with computing element 150. Once provided, administrator computing element 114 can determine whether computing element 150 is permitted to join the private network.

In some implementations, administrator computing element 114 can wait for input indicating that computing element 150 is approved or blocked from joining the network at step 5. The interface can comprise a user selection of a button, a drop-down menu, or some other user interface selection that permits computing element 150 to join the private network. In another implementation, administrator computing element 114 can include one or more rules that indicate whether a computing element is permitted to join the private network. The rules may indicate user identifiers, device identifiers, subnets, or other attributes associated with a computing element that would permit the computing element to join the private network without manual input from an administrator. If a computing element does not qualify for the private network based on the rules, administrator computing element 114 can automatically block the computing element from joining or may wait for further input to indicate whether the computing element is permitted. If a computing element is blocked, no action will be taken by administrator computing element 114, preventing computing element 150 from joining the network. However, if permitted, administrator computing element 115 will sign at least the public key associated with computing element 150 and distribute the signed key to computing elements 110-113 already in the private network at step 6. Once the signed key is communicated to computing elements 110-113, communications can occur between computing elements 110-112 and computing element 150. The signed key can be distributed directly from administrator computing element 114 to the other computing elements or can be communicated via coordination service 120 to the other computing elements.

In addition to providing the signed key to computing elements 110-113, coordination service 120 can distribute communication information to computing elements 110-113 associated with computing element 150. The communication information can include public IP addressing information associated with computing element 150, private IP addressing information associated with computing element 150, or some other communication information associated with computing element 150. The information can be communicated prior to approval from administrator computing element 114 or can be communicated in response to coordination service 120 indicating that computing element 150 is permitted by administrator computing element 150. Further, coordination service 120 can distribute communication information to computing element 150. Although distributed by coordination service 120, communications will not be permitted with computing element 150 until the signed key is distributed by administrator computing element 114 to computing elements 110-113. Computing elements 110-113 can cache the communication information and add the communication information to a configuration after receipt of the signed key from administrator computing element.

In some implementations, administrator computing element 114 can use a private administrative key to sign the public key for computing element 150. The private administrator key is a unique private key that is available to administrator computing element 114, wherein administrator computing element can distribute a public key to check the signature to the other computing elements in the private network. In at least one example, administrator computing element 114 can hash the public key associated with computing element 150 and encrypt the hash using its private key. Once the hash is encrypted, the hash (i.e., signature) can be communicated with the public key for computing element 150 to computing elements 110-113. Each of computing elements 110-113 can check the signature of the key using the public key and determine whether the hash for the signature matches the hash completed by the computing element.

Figure 4:
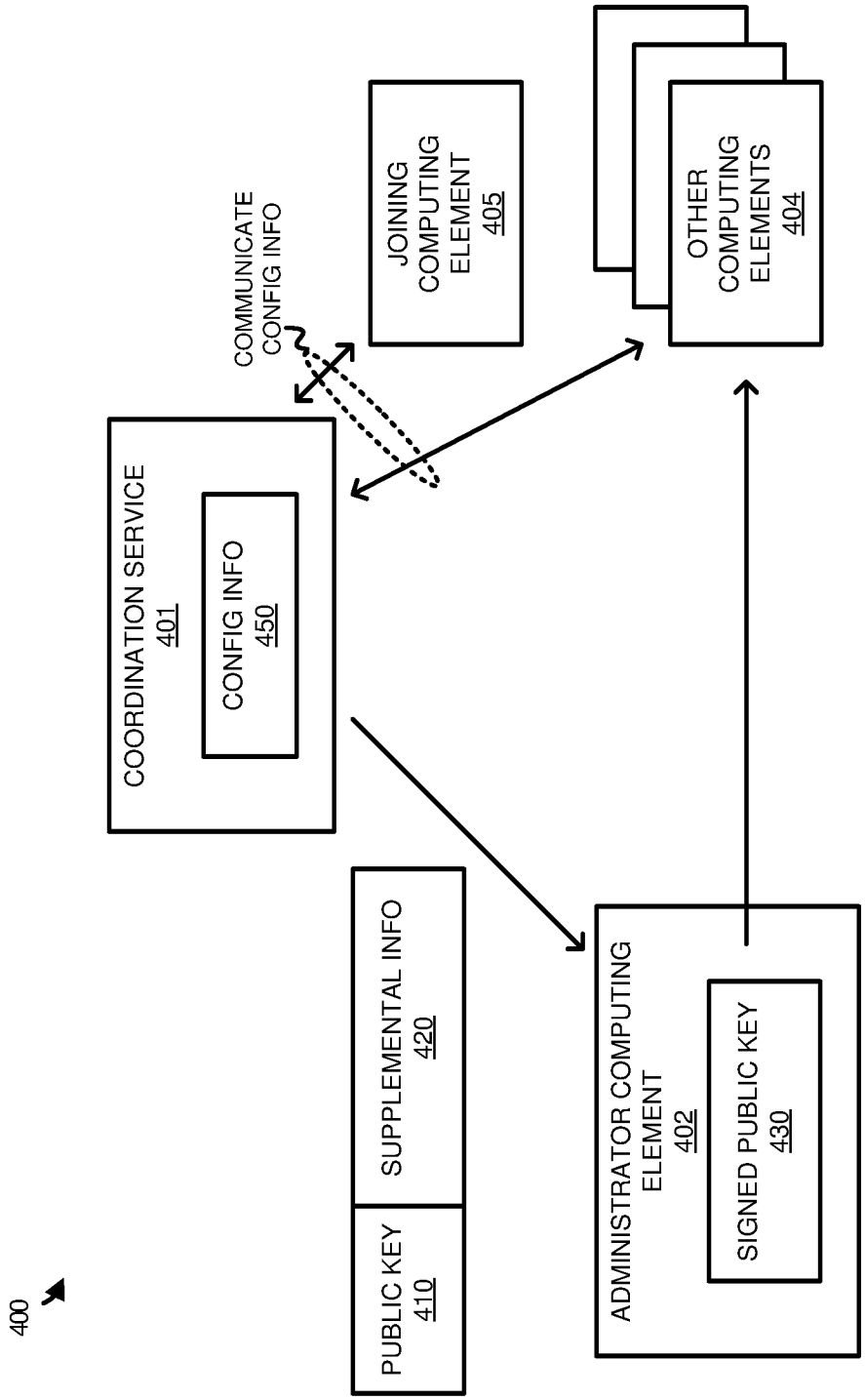
FIG. 4 illustrates an operational scenario of communicating encryption and configuration information to join a computing element to a private network according to an implementation.

FIG. 4 illustrates an operational scenario 400 of communicating encryption and configuration information to join a computing element to a private network according to an implementation. Operational scenario 400 includes coordination service 401, administrator computing element 402, other computing elements 404, and joining computing element 405. Operational scenario 400 further includes configuration information 450 at coordination service 401 that is used to manage the distribution of communication information to various computing elements of a private network.

In operational scenario 400, joining computing element 405 can generate a request to join a private network supported by coordination service 401. In response to the request, which includes public key 410 (public encryption key) and supplemental information 420, coordination service 401 communicates public key 410 and supplemental information 420 to administrator computing element 402. After receiving the information from coordination service 401, administrator computing element 402 can determine whether to permit joining computing element 405 on the network. In some examples, administrator computing element 402 can generate a display that provides supplement information 420 to a user of administrator computing element 402. The administrator can then permit or deny the computing element based on the supplemental information, wherein the supplemental information can include a public IP address associated with joining computing element 405, a user of joining computing element 405, a device name, a device type, or some other information associated with computing element 405. In response to the indication that joining computing element 405 is permitted, administrator computing element 402 can digitally sign public key 410 (signed public key 430) using an administrative key and communicate signed public key 430 to other computing element 404 in the private network. Signed public key 430 can be communicated directly to other computing elements 404 or can be communicated via coordination service 401 in some examples. Once the signed key is verified (i.e., the hash included as part of the signature matches the hash calculated at other computing elements 404 for the public key), other computing elements 404 can be permitted to communicate with joining computing element 405.

In some examples, when joining computing element 405 provides communication information to coordination service 401, coordination service 401 can distribute the communication information to other computing elements 404. The communication information can include a public IP address for joining computing element 405, a private IP address for joining computing element 405, or some other communication information for joining computing element 405. The private addressing information can be allocated by coordination service 401 in some examples. In other implementations, coordination service 401 will only provide communication information when a notification is provided from administrator computing element 402 indicating that joining computing element 405. Similarly, communication information (private and public addressing, encryption keys, and the like) will only be provided to joining computing element 405 when a notification is provided by administrator computing element 402 indicating that joining computing element 405 is approved. Communications with joining computing element 405 will only be permitted when other computing elements 404 receive signed public key 430.

Figure 5:
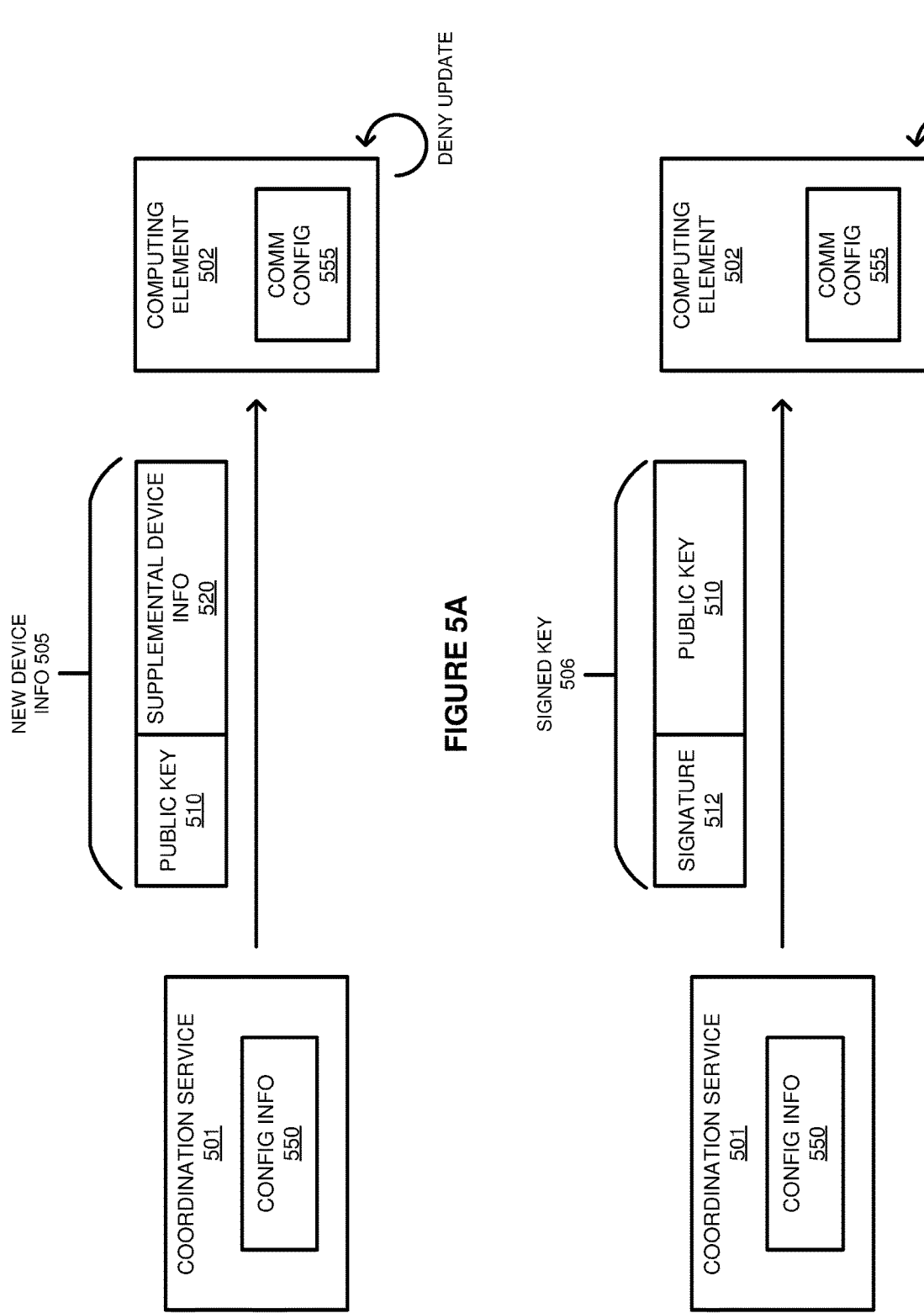
FIGS. 5A and 5B illustrate operational scenarios of receiving information associated with a new computing element according to an implementation.

FIGS. 5A and 5B illustrate operational scenarios of receiving information associated with a new computing element according to an implementation. FIGS. 5A and 5B include coordination service 501, computing element 502. Coordination service 501 further includes configuration information 550 corresponding to communication information for computing elements in a private network and, in some examples, rules that indicate what devices are permitted to communicate in the private network. Computing element 502 further includes communication configuration 555 that comprises public and private addressing information for other computing elements in the private network. FIG. 5A include new device information 505 with public key 510 and supplemental device information 520, and FIG. 5B includes signed key 506 with signature 512 and public key 510.

Referring first to FIG. 5A, new device information 405 is distributed by coordination service 501 to computing element 502, wherein the new device information 405 comprises a public key 510 for the new device (i.e., computing element) and supplemental device information 520 about the new device. Supplemental device information 520 can comprise public addressing information for the new computing device, private addressing information assigned by coordination service 501 to the new device, or some other information associated with the new device. New device information 405 can be supplied by coordination service 501 when the new device requests to join the private network, wherein the new device may provide at least a portion of supplemental device information 520 (e.g., public IP address). In the present example, as public key 510 has not been signed by an administrator computing element, computing element 520 may deny the update, but cache the information pending a signed public key from the administrator computing element.

Turning to FIG. 5B, coordination service 501 distributes a signed key 506 with signature 512 and public key 510 when an administrator approves public key 510. In response to receiving signed key 506, computing element 502 can determine whether public key 510 is permitted by checking signature 512. Checking signature 512 can include applying a hash to public key 510 to identify a value and comparing the value to the decrypted signature to determine whether a match exists. Only if a match exists, will public key be permitted, and communications permitted with the new device.

Although demonstrated as communicating signed key 506 from coordination service 501, the administrator computing element can directly communicate the signed key in some examples. In some implementations, when the administrator computing element receives the unsigned key from coordination service 501, the administrator computing element can present a user interface that permits an administrator to approve the new device. Once approved, signature 512 is generated using an administrator key, wherein signature 512 can be created via a hash of public key 510 and an administrator key applied to the hash. Once the signature is attached to public key 510, signed key 506 can be distributed to other computing elements in the private network. The computing elements can decrypt signature 512 via a key that is distributed from the administrator computing system and is used for signing permitted public keys.

In some implementations, when a signed key is generated, the coordination service can store the signed keys and distribute the signed keys as part of the communication information to the computing elements in the network. Only the computing elements with signed public keys will be permitted to communicate via the private network. Once permitted, a first computing element can generate a packet using the private addressing for a second computing element. The first computing element will encapsulate the packet in a second packet using the public encryption key for the second computing element and use public addressing information in the header of the second packet. Once the second packet is generated, the packet can be communicated to the second computing element, wherein the second computing element can decapsulate the packet using the private key for the second computing element.

Although demonstrated as permitting other computing elements to communicate in the private network, the administrator computing element can be part of the private network and communicate with other computing elements using private addressing distributed via coordination service 501.

Figure 6:
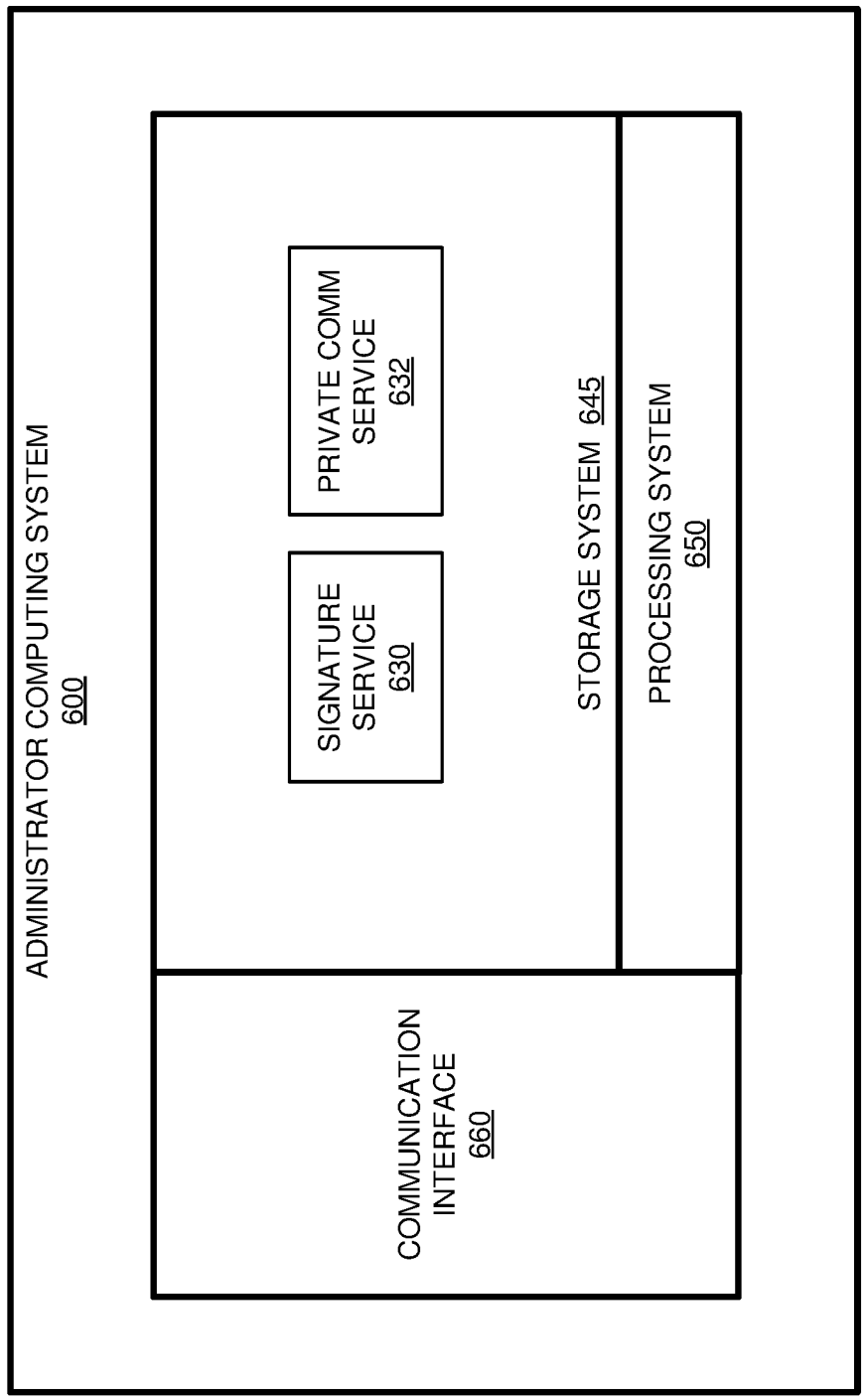
FIG. 6 illustrates an administrator computing system that manages new computing elements joining a private network according to an implementation.

FIG. 6 illustrates an administrator computing system 600 that manages new computing elements joining a private network according to an implementation. Computing system 600 is representative of any computing system or systems with which the various operational architectures, processes, scenarios, and sequences disclosed herein for an administrator computing element can be implemented. Computing system 600 is an example computing element of administrator computing element 114, although other examples may exist. Computing system 600 includes storage system 645, processing system 650, and communication interface 660. Processing system 650 is operatively linked to communication interface 660 and storage system 645. Communication interface 660 may be communicatively linked to storage system 645 in some implementations. Computing system 600 may further include other components such as a battery and enclosure that are not shown for clarity. Examples of computing system 600 can include computing devices, such as laptop computers, desktop computers, smartphones, tablets, or some other computing device.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 may be configured to communicate with other computing elements in a private network and a coordination service that manages the distribution of communication information to the computing elements in the private network. The computing elements can comprise physical devices, such as computers, or can comprise virtual machines.

Processing system 650 comprises microprocessor and other circuitry that retrieves and executes operating software from storage system 645. Storage system 645 may include volatile and nonvolatile, removable, and non-removable media implemented in any method or technology for storage of information, such as computer readable instructions, data structures, program modules, or other data. Storage system 645 may be implemented as a single storage device but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises signature service 630 and private communication service 632 that provides at least the portions of operation 200 of FIG. 2 that correspond to an administrator computing element. The operating software on storage system 645 may further include an operating system, utilities, drivers, network interfaces, applications, or some other type of software. When read and executed by processing system 650, the operating software on storage system 645 directs computing system 600 to operate as described herein.

In at least one implementation, signature service 630 directs processing system 650 to receive a notification for a computing element to join a private network from a coordination service for the private network, wherein the notification includes a public key for communications with the computing element and supplemental information associated with the computing element. The public key corresponds to a public encryption key generated by the computing element to provide secure communications with the computing element. The supplemental information can include user or device identifier information for the computing element, a public IP address for the computing element, location information for the computing element, or some other information for the computing element. Once received, signature service 630 directs processing system 650 to identify input indicating that the computing element is approved for the private network. The input may comprise a direct or manual approval from a user or may comprise a set of rules that indicate attributes for devices permitted to join the private network. If the new computing element is not approved, then no information or signed key will be provided to the other computing elements.

If the new computing element is approved, signature service 630 directs processing system 650 to sign at least the public key associated with the computing element using an administrative key for the administrator computing element. Signing the key may include applying a hash to the public key to generate a value and encrypting the value using the administrative key, wherein the administrative key comprises a private key for administrator computing system 600 to sign keys and approve devices to join the private network. The other computing elements can be provided with a public key to check the hash value and verify the public key for the new device. After the public key is signed, signature service 630 can distribute the signed public key to other computing elements (devices and virtual machines) to permit communications in the private network. Each of the computing elements will determine whether the signature is valid using a public key associated with the administrative key and when valid, add the communication information associated with the new device to a permitted communication data structure on the computing element. The data structure can associate the public key with public and private addressing information for the device.

In some implementations, the coordination service will distribute communication information associated with the new computing element to other computing elements in the private network. The communication information can include public and private addressing information for the new computing element, encryption key information, or some other information associated with the new computing element. However, the computing elements will be unable to use the information to communicate with the new computing element until a signed key is received from communication service. The communication information from the coordination can be delayed pending approval from administrator computing system 600, wherein computing system 600 can communicate a notification to the coordination service to distribute the communication information. This can prevent unnecessary communication overhead associated with unapproved computing elements attempting to join the network Although demonstrated as distributing the signed key to other computing elements of the private network, administrator computing system 600 can represent a member of the private network permitted to communicate with other elements in the network. Private communication service 632 directs processing system 650 to receive communication information from a coordination service associated with a newly connected device. Once approved by the administrator associated with computing system 600, the communication information can be added to a data structure for communications in the private network. When an application requests a communication with another computing element in the private network, a private IP address is used in association with the destination. Private communication service 632 identifies the use of the private address for a destination and encapsulates the packet using communication information in association with the destination computing element. The encapsulation can include encrypting the packet using the public key associated with the destination computing element and adding addressing information to support the communication over the network. Once encapsulated, the encapsulated packet is communicated to the destination computing element. Private communication service 632 can further direct processing system 650 to receive a packet from another computing element in the private network. Once received, the packet can be decapsulated using the local private key associated with communications (different from the administrative key used for signing and approving other computing elements) and forwarded to the destination application executing on computing system 600.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
    in an administrator computing element for a private network, receiving a notification for a computing element to join the private network from a coordination service for the private network, wherein the notification includes a public key for communications with the computing element and supplemental information associated with the computing element;
    in the administrator computing element, identifying input indicating that the computing element is approved for the private network;
    in the administrator computing element and in response to the input, signing at least the public key associated with the computing element using an administrative key for the administrator computing element; and
    in the administrator computing element, distributing the signed public key to one or more other computing elements in the private network, wherein the signed public key permits communication with the computing element by the one or more other computing elements.

2. The method of claim 1 further comprising:
    in the computing element, generating a request to join the private network, wherein the request comprises at least the public key for communication with the computing element;
    in the computing element, communicating the request to the coordination service for the private network.

3. The method of claim 2, wherein the request further comprises a public IP address associated with the computing element, a user associated with the computing element, or a device type for the computing element.

4. The method of claim 2, wherein the request further comprises a public IP address associated with the computing element, and the method further comprising:
    in the coordination service, distributing at least the public IP address and a private IP address for the computing element to the one or more other computing elements.

5. The method of claim 1, wherein the supplemental information comprises a device name for the computing element, device type for the computing element, or a user associated with the computing element.

6. The method of claim 1 further comprising:
in the coordination service, distributing communication information associated with the one or more other computing elements to the computing element.

7. The method of claim 6 further comprising:
in the coordination service, distributing communication information associated with the administrator computing element to the computing element.

8. The method of claim 6 further comprising:
in the administrator computing element, communicating an approval notification to the coordination service to permit the computing element in the private network; and
wherein distributing the communication information occurs in response to receiving the approval notification.

9. The method of claim 1 further comprising:
in a first computing element of the one or more other computing elements, determining whether the public key is permitted based on a signature of the public key; and
in the first computing element and when the public key is permitted, adding the public key for the computing element to a data structure for permitted communications in the private network.

10. A computing apparatus comprising:
a storage system;
a processing system operatively coupled to the storage system; and
program instructions stored on the storage system that, when executed by the processing system, direct the computing apparatus to:
 receive a notification for a computing element to join a private network from a coordination service for the private network, wherein the notification includes a public key for communications with the computing element and supplemental information associated with the computing element;
 identify input indicating that the computing element is approved for the private network;
 in response to the input, sign at least the public key associated with the computing element using an administrative key for the administrator computing element; and
 distribute the signed public key to one or more other computing elements in the private network, wherein the signed public key permits communication with the computing element by the one or more other computing elements.

11. The computing apparatus of claim 10, wherein the supplemental information comprises a public IP address associated with the computing element, a user associated with the computing element, a device type for the computing element, or a device name for the computing element.

12. The computing apparatus of claim 10, wherein the program instructions further direct the computing apparatus to:
communicate an approval notification to the coordination service to trigger a distribution of at least a public IP address and a private IP address for the computing element to the one or more other computing elements.

13. A system comprising:
a first computing device;
one or more additional computing devices;
a coordination service for a private network executing on one or more computing devices; and
an administrator computing device configured to:
 receive a notification for the first computing device to join the private network from the coordination service, wherein the notification includes a public key for communications with the first computing device and supplemental information associated with the first computing device;
 identify input indicating that the first computing device is approved for the private network;
 in response to the input, sign at least the public key associated with the first computing device using an administrative key for the administrator computing device; and
 distribute the signed public key to the one or more additional computing devices, wherein the signed public key permits communication with the first computing device by the one or more additional computing devices.

14. The system of claim 13, wherein the first computing device is further configured to:
generate a request to join the private network, wherein the request comprises at least the public key for communication with the first computing device; and
communicate the request to the coordination service.

15. The system of claim 14, wherein the request further comprises a public IP address associated with the first computing device, a user associated with the first computing device, a device name for the first computing device, or a device type for the first computing device.

16. The system of claim 14, wherein the request further comprises a public IP address associated with the first computing device, and wherein the coordination service is further configured to:
distribute at least the public IP address and public encryption key for the first computing device to the one or more additional computing devices.

17. The system of claim 13, wherein the supplemental information comprises a device name for the first computing device, a device type for the first computing device, or a user associated with the first computing device.

18. The system of claim 13, wherein the coordination service is further configured to distribute communication information associated with the one or more additional computing devices to the first computing device.

19. The system of claim 18, wherein the administrator computing device is further configured to:
communicate an approval notification to the coordination service to permit the first computing device in the private network; and
wherein distributing the communication information occurs in response to receiving the approval notification.

20. The system of claim 13, wherein a second computing device of the one or more additional computing devices is configured to:
determine whether the public key is permitted based on the signing of a signature of the public key; and
when the public key is permitted, add the public key for the first computing device to a data structure for permitted communications in the private network.

* * * * *